United States Patent
Wahlmark

[11] 3,831,697
[45] Aug. 27, 1974

[54] RACK AND PINION POWER STEERING
[75] Inventor: Gunnar A. Wahlmark, Dixon, Ill.
[73] Assignee: Wahlmark Systems, Inc., Chicago, Ill.
[22] Filed: Oct. 3, 1973
[21] Appl. No.: 403,201

[52] U.S. Cl. .............................. 180/79.2 R, 91/374
[51] Int. Cl. ............................................ B62d 5/08
[58] Field of Search .................. 180/79.2 R, 79.2 B; 91/374

[56] References Cited
UNITED STATES PATENTS
2,707,375  5/1955  Hammond ........................ 91/374 X
3,199,414  8/1965  Gray ................................. 91/374 X
FOREIGN PATENTS OR APPLICATIONS
163,908  11/1964  U.S.S.R. ...................... 180/79.2 R Primary Examiner—David Schonberg
Assistant Examiner—John A. Pekar
Attorney, Agent, or Firm—Lee & Smith

[57] ABSTRACT

A power steering system integrated with conventional manual rack and pinion steering for an automotive vehicle. The system includes a housing in which are disposed a rack adapted to move rectilinearly along the axis of the housing and a pinion adapted to rotate in response to steering movements by a driver turning the vehicle's steering wheel. The rack engages the pinion so that rotation of the pinion moves the rack in conventional fashion. A pair of tie rods couple the rack to the vehicle's front left and right wheel steering mechanisms. A pair of piston heads fit snugly in the housing with one piston head attached to one end of the rack and the other piston head attached to the opposite end of the rack. The rack is received in the piston heads so that it can shift slightly in the vertical direction as the load on the rack changes due to changes in driving conditions. The power steering system has a steering valve which includes a body member with at least one groove therein and a sleeve having a plurality of openings therein. The sleeve fits snugly about the body member and the sleeve and body member are adapted to move relative to each other. Means are provided for moving the sleeve and body member, such means including a pair of follower elements which respond to rack and pinion movement. One follower element has one end connected to the body member and another end in frictional engagement with the pinion to move the body member in response to rotational movement of the pinion. The other follower element has one end connected to the sleeve and another end in frictional engagement with the rack to move the sleeve in response to axial movement of the rack. The system further includes a regulator for the steering pump in the form of a piston-like bearing member which tends to force the rack into engagement with the pinion, and regulates the hydraulic pressure produced by the pump by its up and down vertical movement as the load on the rack changes.

16 Claims, 12 Drawing Figures

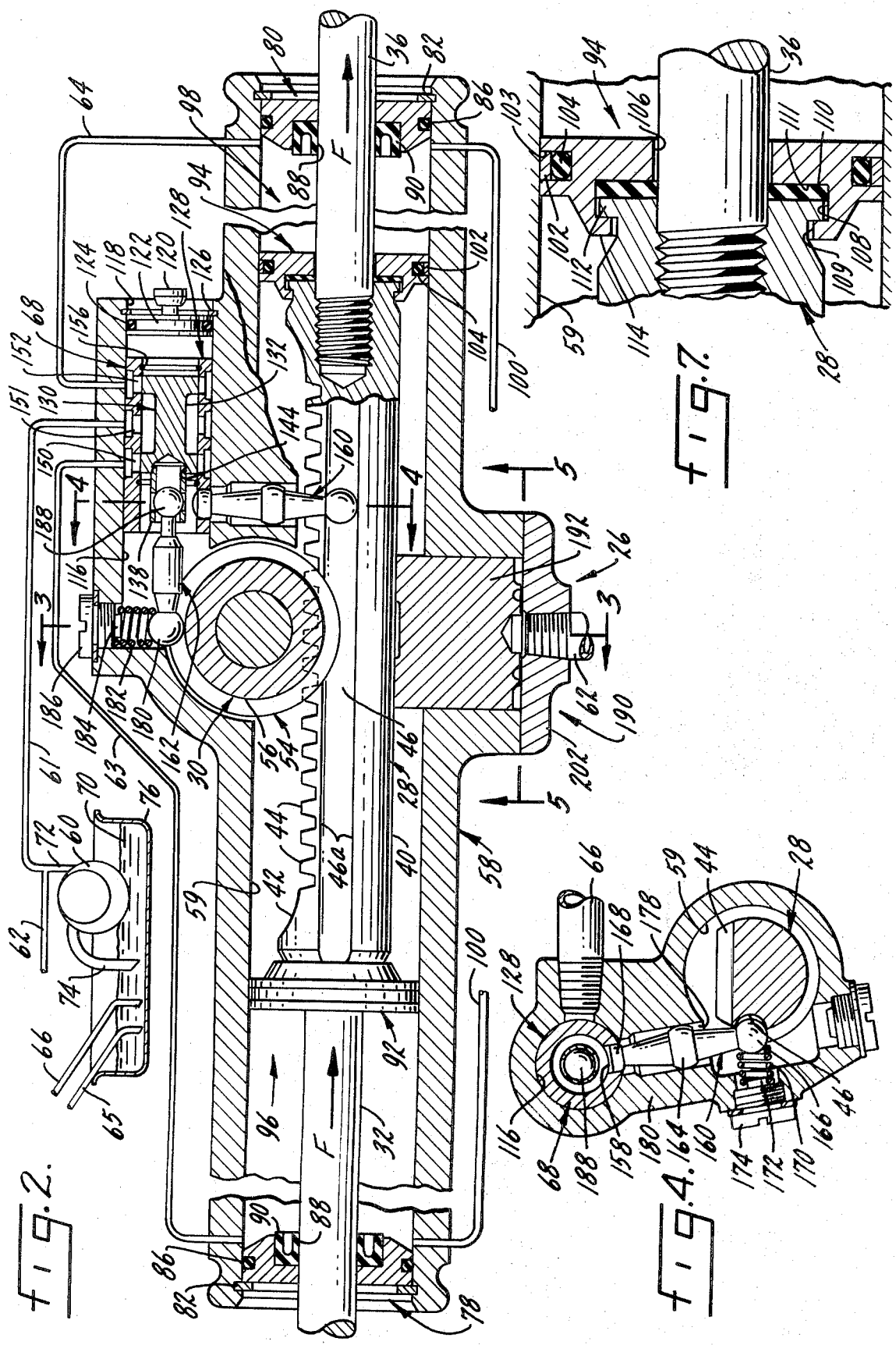

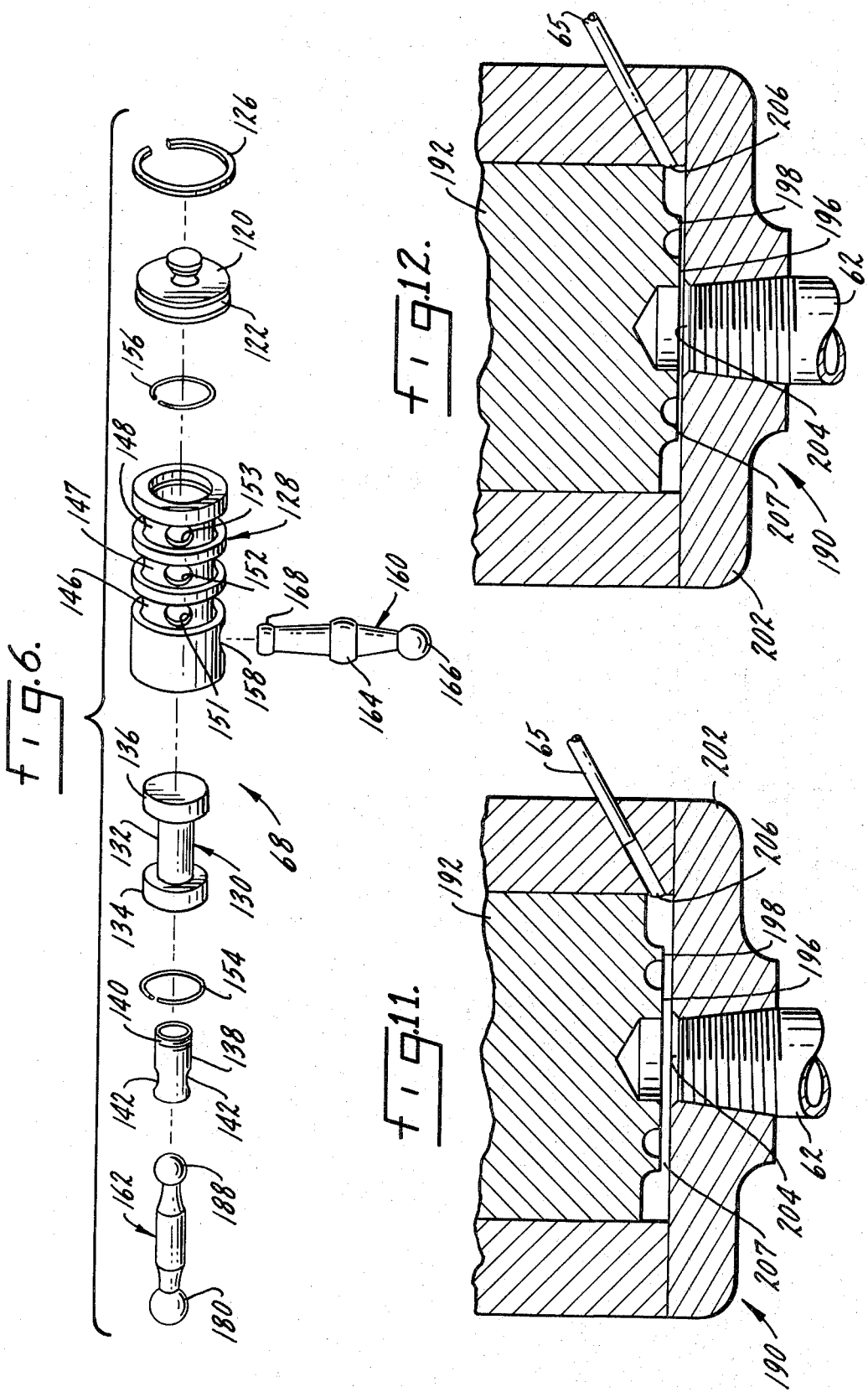

3,831,697

RACK AND PINION POWER STEERING

BACKGROUND

In the automotive industry there are two types of steering mechanisms generally employed. One includes a pitman shaft engaging a worm gear that moves the pitman shaft to control the steering mechanism. This type of steering mechanism has been equipped with hydraulic systems which provide a power assist during steering. The other steering mechanism employs a rack and pinion for controlling steering. Rack and pinion steering is believed to be preferable to the pitman shaft steering because it provides the driver with a better feel of road conditions. It is the objective of the present invention to provide rack and pinion steering with a power assist but to simulate or retain, at least in part, the road feel attained with the rack and pinion steering.

SUMMARY OF THE INVENTION

Broadly, the invention is an improved hydraulic power steering system. This system includes a drive member such as the pinion commonly employed in rack and pinion steering, and a driven member such as the rack employed in rack and pinion steering. Means are provided for applying hydraulic pressure to the driven member to provide a power assist therefor. The pressure applying means include a pump for pumping hydraulic fluid to the driven member, fluid transmission means for placing the pump in fluid communication with the driven member, and valve means for controlling the flow of fluid to the drive member. The valve means includes a pair of valve members which move relative to each other to control fluid flow. Means are provided for moving the valve members including a first follower element having one end connected to one of the valve members and another end in frictional engagement with the drive member, and a second follower element having one end connected to the other valve member and another end in frictional engagement with the driven member. Thus, the valve members will be moved to different positions relative to each other in response to the movement of the drive and driven members, e.g., the pinion and rack. Means are provided which urge the valve members to a position which interrupts or discontinues substantially all flow of fluid to the driven member when a moving force is not being exerted by the drive member.

In accordance with another feature of the invention, the valve means automatically regulates the hydraulic pressures applied to the driven member whenever sudden changes in driving conditions occur. For example, if there is a sudden decrease in wind action on the vehicle, the pressures acting on the driven member will be equalized. In accordance with a further feature of the invention, regulator means are provided for controlling pump pressure. The regulator means are responsive to changing loads on the rack to change the pump pressure in proportion to rack load. These features provide road feel and zero backlash.

The attached drawings and accompanying description which follow disclose the details of the rack and pinion power steering system.

BRIEF DESCRIPTION OF THE DRAWINGS

FIG. 2 is an enlarged cross sectional view of my power steering system taken along line 2—2 of FIG. 1, with sections broken away.

FIG. 4 is a cross sectional view taken along line 4—4 of FIG. 2.

FIG. 6 is an exploded perspective view of the servo-valve shown in FIG. 2.

FIG. 7 is a further enlarged detail view showing the piston attached to one end of the rack.

FIGS. 11 and 12 are further enlarged sectional views of the pressure regulator shown under different load conditions on the rack.

DETAILED DESCRIPTION

Figure 1:
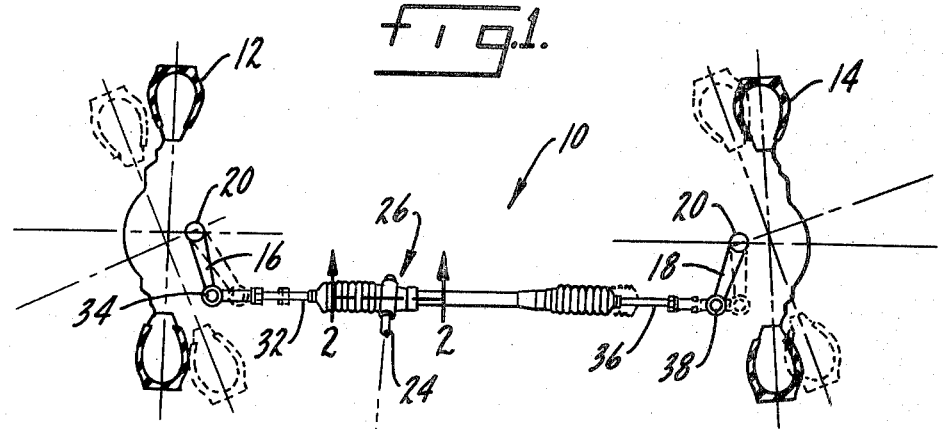
FIG. 1 is a plan view schematically illustrating the rack and pinion steering system of the invention as installed in an automotive vehicle.

FIG. 1 shows a steering assembly 10 for an automotive vehicle. As conventional, the front wheels 12 and 14 of the vehicle are mounted to the frame by means of suitable spring suspension mechanism (not shown) and are steered through respective steering arms 16 and 18 which are pivoted at suitable ball joints or king pins 20. The vehicle's steering wheel 22 is coupled through a steering wheel shaft 24 to the rack and pinion power steering systems of the present invention, generally indicated as 26.

Figure 3:
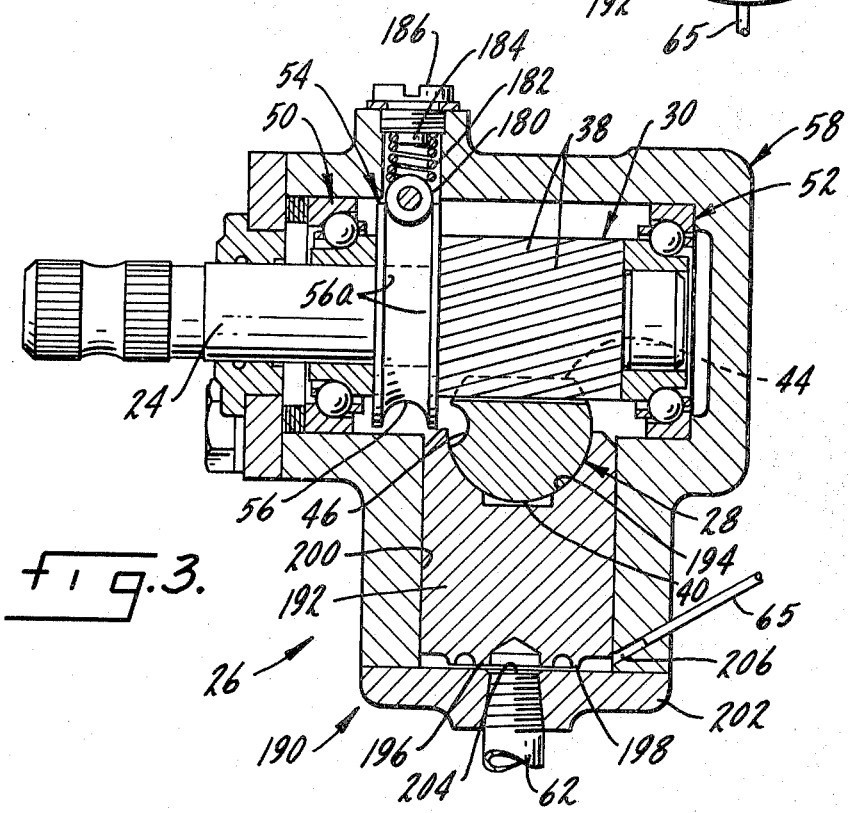
FIG. 3 is a cross sectional view taken along line 3—3 of FIG. 2.

The power steering system 26 includes a rack 28 and a pinion 30 shown in FIGS. 2 and 3. The left end of the rack 28 is connected to a left hand tie rod 32 and a pivot 34 to the one steering arm 16. The right end of the rack 28 is connected by a right hand tie rod 36 and pivot 38 to the other steering arm 18. When the driver of the vehicle turns the steering wheel 22, the shaft 24 turns the pinion 30 to move the rack 28 either to the left or the right, which turns the front wheels left or right, respectively, depending upon whether the driver rotates the steering wheel counter clockwise or clockwise. The power steering system 26 provides a unique power system for power-assisted movement of the rack 28.

FIGS. 2 through 6 show the detailed construction of the power steering system 26. In addition to the rack 28 and the pinion 30, the system 26 includes a housing 58 which contains the rack and pinion, a pump 60 for pumping hydraulic fluid to the housing, a plurality of transmission lines 61, 62, 63, 64, 65 and 66, placing the pump in communication with the housing, and a servo-valve 68 for controlling the flow of hydraulic fluid 70 through the transmission lines.

The rack 28 has a lower surface 40 of arcuate cross-section and an upper portion 42 with the rack teeth 44 protruding upwardly therefrom. A longitudinally extending groove 46 runs along the side of the rack 28. As best seen in FIG. 4, this groove 46 has a modified wedge-shaped cross section with the sides 46a of the wedge being slightly acruate. The pinion 30 is secured to the lower end of the steering wheel shaft 24 and its teeth 38 (FIG. 3) mesh with the teeth 44 of the rack 28. The pinion 30 is above the rack 28 and generally at right angles thereto. A pair of bearing assemblies 50 and 52 hold the steering wheel shaft 24 in position while permitting the shaft to turn the pinion 30 either clockwise or counter clockwise (as viewed by the driver of the vehicle). Secured to this shaft 24 is a friction wheel 54 having a track 56 (FIG. 3) running about the wheel's circumference. This track 56 has a wedge-shaped cross section with the wedge sides 56a being slightly arcuate.

The pump 60, which is schematically illustrated, is of a conventional design preferably of the vane type and having a pressure side 72 and a return or suction side 74. The pressure side 72 of the pump 60 is connected through the main transmission line 61 and the branched transmission line 62 to the housing 58. The suction side 74 of the pump 60 draws hydraulic fluid 70 contained in a schematically illustrated tank 76 into the pump, and the pair of return lines 65 and 66 (FIGS. 3 and 4) return hydraulic fluid 70 from the housing 58 to this tank.

The housing 58 has a generally cylindrically shaped hollow interior cylinder bore 59 with its opposed ends closed off by a pair of end caps 78 and 80. Each end cap 78 and 80 is held in place by a snap ring 82 which fits into a corresponding groove in the housing 58. An O-ring 86 in each cap 78 and 80 provides a seal at the junctures with the housing interior bore 59. Each cap 78 and 80 has a central opening 88 surrounded by a bushing or seal 90 about the end portion of the respective tie rods 32 and 36. These seals 90 prevent leakage of fluid as the tie rods are shifted axially. The housing 58 is disposed in a generally horizontal position, and the rack 28 is disposed horizontally along the longitudinal axis of the hollow interior bore 59. Secured at opposite ends of the rack are piston heads 92 and 94. The space between the left hand end cap 78 and the left hand piston head 92 forms a left hand pressure chamber 96, and the space between the right hand cap 80 and the right hand piston head 94 forms a right hand pressure chamber 98. These chambers 96 and 98 are connected, respectively, by the transmission lines 63 and 64 to the pressure side 72 of the pump 60 through the servo-valve 68 and the main transmission line 61. These chambers 96 and 98 are also in fluid communication with each other through a line 100 which extends between these chambers.

The pistons 92 and 94 are identical. For the purpose of illustration, the piston head 94 has been shown in enlarged detail in FIG. 7. This head 94 has a central opening 106 through which passes the end portion of the rod 36, with an annular clearance as shown. The rod 36 has a threaded end which screws into a threaded receiving bore in the end of the rack 28. There is an annular groove 103 about the circumference of the piston 94 which carries a piston ring 102 encircling an O-ring 104. The piston ring 102 fits snugly against the wall of the housing interior bore 59 and prevents substantial leakage of fluid between the ring and the surface of the cylinder bore 59, while the O-ring 104 prevents leakage through the groove 103. The piston head 94 also includes a cavity 108 having a mouth 109 adapted to receive the end of the rack 28 and an internal wall 111. Within the cavity 108 is a rubber washer 110, encircling the end of the rod 36 and disposed between the end of the rack 28 and the cavity wall 111. This washer 110 prevents leakage of fluid through the cavity 108 and the opening 106. The end of the rack 28 has an annular flange 112 which an annular lip 114 at the mouth 109 grips. The lip 114 may be formed after the end of the rod 28 is inserted into the cavity 108. This lip 114 holds the flange 112 firmly, but the mouth 109 is sufficiently large to permit the rack 28 to shift slightly in a vertical direction. For normal size systems 26 used in two to six passenger vehicles the extent of such vertical movement will range between about .002 and about .005 inch. As will be explained in detail below, this permits the rack 28 to shift slightly up and down as the load on the rack changes under different road and driving conditions. This piston 92 is similarly secured to the opposite end of the rack 28 so that the rack can shift up and down slightly at either or both ends.

In accordance with one important feature of the invention, the servovalve 68 controls the flow of hydraulic fluid 70 to the left and right hand pressure chambers 96 and 98 in response to movement of the rack 28 and pinion 30. This servo-valve 68 fits snugly in a cylindrical recess 116 (FIG. 2) in the housing 58. An end opening 118 in the recess 116 permits insertion of the valve 68. A cover 120 having an annular groove 122 receiving an O-ring 124 closes off the open end 118 of the recess 116, and a snap ring 126 holds the cover in position.

As best shown in FIG. 6, the servo-valve 68 has two principal components: a sleeve 128 and a body member or spool 130. The sleeve 128 fits snugly about the spool 130, and the sleeve and spool are adapted to move relative to each other. The spool 130 has a cylindrical shape with a deep groove 132 encircling the central portion of the spool, and a pair of raised annular lands 134 and 136 surrounding the groove. Attached to one end of the spool is a hollow cylinder 128 having a threaded end 140 and radially aligned openings 142 passing through the cylinder sides. The end 140 screws into a threaded bore 144 (FIG. 2) in the spool 130. The sleeve 128 has three annular grooves 146, 147 and 148 formed about the exterior surface of the sleeve, and respective radial ports 150, 151 and 152 communicating with the grooves 146, 147 and 148. A pair of stop rings 154 and 156 are spaced opposite the ends of the spool 130 in internal grooves of the sleeve 138 to limit axial movement of the spool within the sleeve.

A pair of follower arms 160 and 162, connected respectively to the sleeve 128 and spool 130, moves the sleeve and spool as the rack 28 and pinion 30 move. The rack follower arm 160 includes an enlarged central pivot ring 164, a ball end head 166 at one end, and a partial ball 168 at the other end which fits snugly in a radial opening 158 formed in the sleeve 128. As shown in FIG. 4, a spring 170 urges the ball end head 166 into frictional engagement with the horizontal track 46 in the rack 28. One end of the spring 170 is seated on a boss 172 extending from a screw 174 used to adjust spring pressure. The follower arm 160 is disposed within a generally vertical cavity 178 formed in a wall portion 180 in the housing 58. The pivot ring 164, fitting snugly against the wall of the cavity 178, enables the arm 160 to pivot about the ring 164 as the rack 28 moves to and fro. The pivoting movement of the follower arm 160 causes the sleeve 128 to move rectilinearly, changing the relative positions of the ports 150, 151 and 152 in the sleeve with respect to the groove 132 in the spool 130.

The pinion follower arm 162 follows the movement of the pinion 30 through the friction wheel 54 to cause movement of the spool 130 rectilinearly. This follower arm 162 includes an enlarged ball end 180 in frictional engagement with the track 56 in the friction wheel 54. As shown in FIG. 3, a spring 182 holds the enlarged end 180 snug against the track 56. This spring 182 is seated on a boss 184 of a screw 186 used to adjust the pressure applied by the spring. A smaller ball end 188 at the opposite end of the follower arm 162 is force fitted into the end of the cylinder 138 so that it is universally secured to the cylinder 138 by means of the openings 142. When the driver turns the steering wheel 22, the friction wheel 54 rotates as the result of rotation of the shaft 24, and the follower arm 162 is frictionally moved by this wheel 154 slightly to the right or the left, depending upon the direction of rotation, to move the spool 130 rectilinearly.

Figure 5:
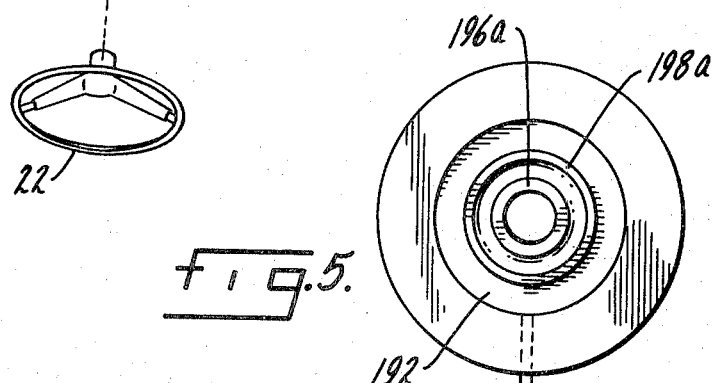
FIG. 5 is a cross sectional view taken along line 5—5 of FIG. 2.

In accordance with another important feature of the invention, the power steering system 26 includes a pressure regulator 190 for automatically controlling the pressure produced by the pump 60. This regulator 190 changes the pump pressure in proportion to the load on the rack 28. As best shown in FIGS. 3 and 5, the regulator 190 includes a cylindrical bearing member 192 having an arcuate bearing surface 194 which fits over the corresponding arcuate bottom surface 40 of the rack 28. The top of this bearing member 192 includes a pair of raised annular rings 196 and 198 which are concentric. The tops of these rings 196 and 198 form flat lands 196a and 198a. The bearing member 192 fits snugly within a lower pressure chamber 200 formed in the housing 58. The chamber 200 has an open lower end closed by a cap 202. The cap 202 has an inlet 204 which is connected to the branched transmission line 62 so that the top of the bearing member 192 is placed in fluid communication with the pressure side of the pump 60. The chamber 200 also has an outlet 206, and the return line 65 passing through the side wall of the chamber is connected to this outlet. This arrangement permits hydraulic fluid 70 to flow through the chamber 200 and return to the tank 76.

The pump pressure is controlled by the bearing member 192 which is adapted to move up and down in response to slight vertical movement of the rack 28. This movement of the bearing member 192 controls the size of the gaps 207 (FIGS. 11 and 12) between the cap 202 and the annular elements 196 and 198 in the top of the member. The size of the gaps 207 controls the pressure produced by the pump 60. As the gaps 207 decrease in size, the pump pressure increases because of the increased resistance to fluid flow through the gaps. As the gaps increase in size, the pump pressure decreases.

The lands 196a and 198a serve two different purposes. The outer annular land 198a is used to dampen any hydraulic noise which might occur during any vibratory movement of the bearing member 192. The surface area of the inner annular land 196a serves to control the upward force of the hydraulic fluid 70 acting against the bearing member 172. If the area of this land 196a is enlarged, the upward force will increase, and if this area is made smaller, the upward force will decrease. In accordance with the invention, the sensitivity of my power steering sub-assembly 26 to road conditions can be controlled by controlling the area of the inner annular land 196a. Specifically, the area of the land 196a determines the amount of force the driver will have to exert on the steering wheel 22 to turn the wheel. If the surface area of the land 196a is relatively large, the driver will be required to exert more turning force on the steering wheel 22 because the regulator member 192 is forced against the rack 28 with greater force to increase the frictional drag. If this area is smaller, the driver will use less force to turn the steering wheel 22 because the frictional drag is smaller. Since the power boost system is applied to a rack and pinion steering mechanism which is accurately sensitive to change in road conditions, and which precisely enchanced through action of the pressure regulator 190, an accurate road "feel" is conveyed to the driver. Accordingly, "feel" will vary precisely as road conditions vary, and the relative magnitude can be adjusted as desired.

Operation

Figure 8:
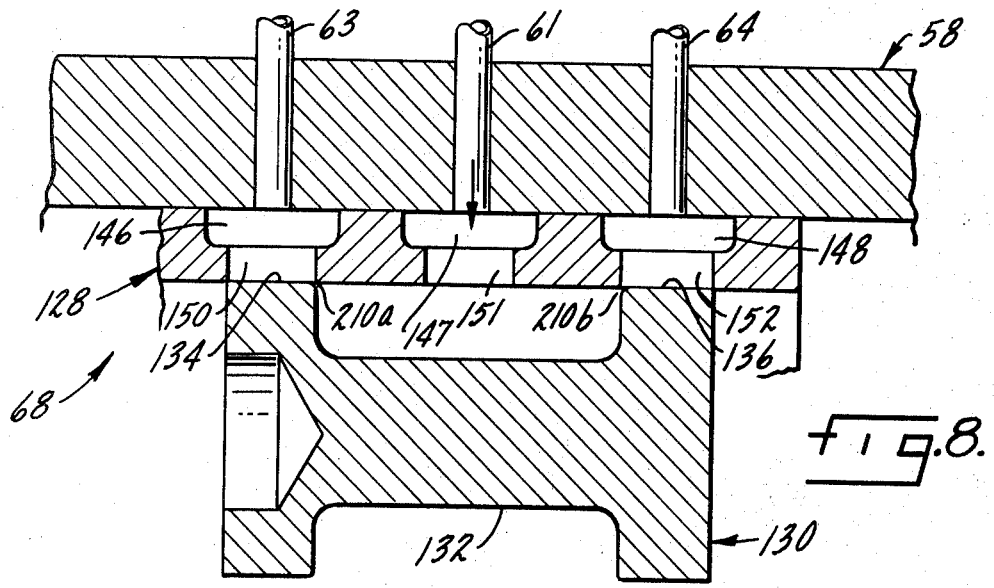
FIGS. 8 through 10 are further enlarged sectional views of the servovalve, with the spool and sleeve of the servo-valve in different relative positions.

The power steering system 26 operates as follows:

First, assume the vehicle is traveling along the highway with essentially no side wind acting on it. The driver holds the steering wheel 22 steady and the servo-valve 68 will be in a neutral position shown in FIGS. 2 and 8. Under these conditions, the lands 134 and 136 of the spool will be aligned with the left and right hand ports 150 and 152, respectively, in the sleeve. As best shown in FIG. 8, there are slight gaps 210a and 210b between the respective lands 134 and 136 and ports 150 and 152 when the servo-valve is in the neutral position, so that hydraulic fluid flows through the groove 132 and these gaps, respectively, through transmission lines 63 and 64 and into the left and right hand pressure chambers 96 and 98. The pressure acting on the piston heads 92 and 94 will be of equal force and opposite in direction.

Since the rack 28 is not moving, the bearing member 192 of the regulator 190 will be relatively large as shown in FIG. 11. Thus, the flow resistance is reduced so that the pressure produced by the pump 60 is relatively low, for example, about 50 pounds per square inch.

Figure 9:
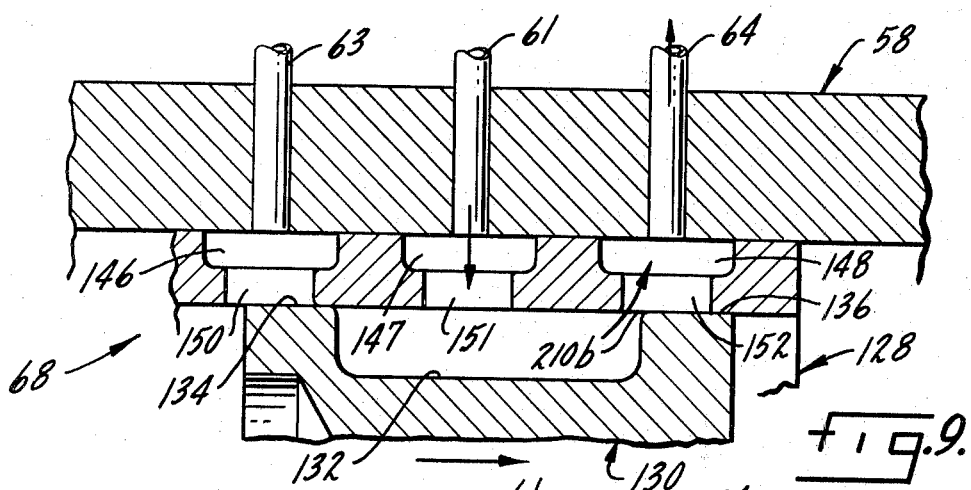
Figure 10:
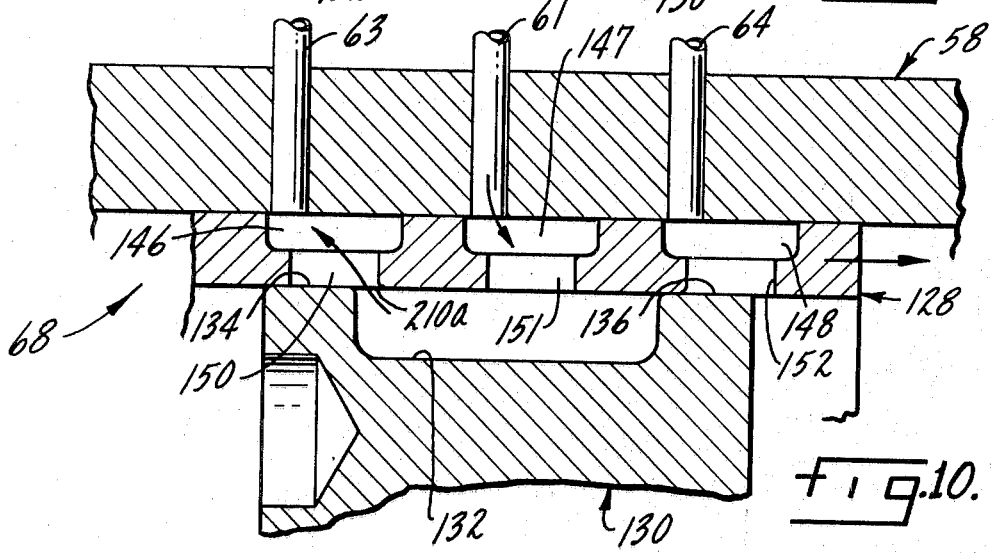

Assume the driver turns the steering wheel 22 in a clockwise direction. The steering wheel shaft 24 will rotate in a clockwise direction, rotating the friction wheel 54 and pinion 30 clockwise. The clockwise movement of the pinion 30 causes the rack 28 to move to the left. Simultaneously, the wheel or pinion follower arm 162 moves slightly to the right due to the frictional connection between the ball end head 180 and the track 56 of the friction wheel 54. This moves the spool 130 to the right to change the position of the spool relative to the sleeve 128. This new relationship is illustrated in FIG. 9. The left hand land 134 of the spool 130 now closes the gaps 210a, preventing the flow of hydraulic fluid through ports 150 into the left hand pressure chamber 96. The right hand land 136 is moved to the right, increasing the size of the gaps 210b, so that more hydraulic fluid flows through the opening and the transmission line 64 to the right hand pressure chamber 98. This causes the pressure in the right hand chamber 93 to exceed the pressure in the left hand chamber 96 so that movement of the rack 28 toward the left is assisted or power-boosted by the increased pressure in the right hand pressure chamber. As long as the driver continues to turn the steering wheel clockwise, this relationship between the spool 130 and sleeve 128 prevails, maintaining a differential in pressure between the left and right hand chambers 96 and 98 to provide a power assist during steering.

As the rack 28 moves to the left, the rack follower member 160 pivots in a clockwise direction to move the sleeve to the right. However, for any given rotation of the steering wheel, the sleeve 128 does not move as far to the right as the spool 130, because the effective diameter of the friction wheel 54 is greater than the pitch diameter of the pinion 30. Preferably, the diameter of the friction wheel 54 should be such that the spool 130 has a slightly greater instantaneous velocity than the sleeve 128 to maintain the power boost as long as the driver continues to turn the steering wheel and to increase the size of the gaps 210b as the wheel is turned faster to increase the power assist reaction.

When the driver stops turning the wheel 22, the sleeve 120 and the spool are returned by the springs 170 and 182 to the neutral positions shown in FIG. 8.

If the driver turns the steering wheel 22 in a counter-clockwise direction, the spool 130 is moved to the left rather than the right so that the pressure in the left hand chamber 96 is increased to provide a power assist to the rack 28 as it moves to the right. The sleeve 128 will follow this movement to the left, and both the spool 130 and sleeve will be returned to the position shown in FIG. 8 when the steering wheel 22 stops turning.

The line 100 connecting the pressure chambers 96 and 98 together permits hydraulic fluid 70 displaced from one chamber to flow into the other chamber. This line is relatively small in diameter so that a limit is placed on the top speed of power boost. There is essentially no fluid flow between the pressure chambers 96 and 98 when the rack 28 and pinion 30 are not moving.

Assume the vehicle is subjected to a side wind blowing against the right side which tends to make the vehicle veer toward the left. The driver must cock the wheels 12 and 16 slightly to the right to turn them into the wind in order to maintain the vehicle on straight line steady course. Under these conditions, there will be a force applied from the wheels through the tie rods 32 and 36 in a direction indicated by the arrows F in FIG. 2. The relationship between the spool 130 and sleeve 128 will be such that the right hand ports 152 in the sleeve 128 will be exposed slightly more than the left hand ports 150 similar to the relationship shown in FIG. 9. This relationship exists because a clockwise turning force is applied by the driver through the shaft 24, and this force causes the follower arm 162 to shift slighly to the right. This permits sufficient pressure to build up within the right hand chamber 98 to compensate for the force F applied by the side wind. In other words, the force applied by the side wind through the left hand tie rod 32 plus the hydraulic pressure in the left hand pressure chamber 96 will equal the hydraulic pressure in the right hand pressure chamber 98. If the side wind ceases suddenly, for example, if the vehicle passes into a tunnel, the pressure in the right hand chamber 98 will exceed the pressure in the left hand chamber 96. This causes the rack to move slightly to the left and downward. This rack movement is sensed by the rack follower arm 160 to move the sleeve 128 to the right as shown in FIG. 9. This closes the gap 210b and exposes the left hand opening 150 in the sleeve 128 so that hydraulic fluid 70 can flow into the left hand pressure chamber 96 to equalize the pressure acting both piston heads 92 and 94. As a consequence, automatic compensation is provided. Conventional power steering systems are not provided with such automatic compensation and, as a result, when there is a sudden change in the forces acting on the piston employed in conventional systems, the power steering mechanism tends to move or steer the vehicle's wheels automatically rather than under the direct control of the driver. Under the assumed conditions, a conventional power steering system would tend to automatically steer the vehicle to the right when the side wind ceased abruptly. With the power steering system of the present invention, the only significant side way movement of the racks occurs under the direct control of the driver, notwithstanding a sudden change in forces acting on the piston heads 92 and 94. Because the driver had to cock the wheels 12 and 14 slightly against the side wind, the vehicle would tend to steer off the road when the side wind ceased as would conventional systems. But with the power steering system 26, a power assist would not be provided. The driver would feel this change in driving conditions immediately and correct for this change to bring the vehicle back on a straight course.

The pressure regulator 190 controls the pump 60 to provide a relatively low pressure whenever the rack 28 and pinion 30 are not moving, but increases the pump pressure whenever the rack and pinion move. This pressure regulator 190 coupled with the rack and pinion steering mechanism provides feel for the driver so that the driver can precisely sense road conditions through the power steering system 26. The bearing member 192 presses against the rack 28, holding the rack against the pinion 30. The greater the force with which this member 192 bears against the rack 28, the greater will be the friction forces between the rack and pinion. Thus, by controlling the area of the annular land 196a, this upward force of the bearing member 192 can be adjusted to give the driver an adequate feel. As the load on the rack 28 increases, the driver will feel more force is required to turn the steering wheel 22. For example, with the vehicle parked, there is a greater degree of friction between the tires and ground as contrasted to the vehicle riding on a smooth highway. This feel is highly desirable and is absent or inaccurately induced in many conventional power steering systems. Whenever the driver turns the steering wheel 22 to turn the rack 28 and pinion 30, the rack moves away from the pinion teeth 48. This decreases the gap 207 between the cap 202 and bearing member 192 such as shown in FIG. 12. A decrease in gap causes an increase in pump pressure, for example, to 300 pounds per square inch. This is highly desirable since it is during turning that higher pressure is needed to provide a power assist.

The pressure regulator 190 also prevents backlash. In conventional rack and pinion steering there is some play between the rack teeth and pinion teeth. Thus, when the driver turns the steering wheel, the steering mechanism does not immediately turn the vehicle's front wheels because of this backlash. In order to maintain road feel, this requires the driver of a conventional steering system to constantlly oscillate the steering wheel, particularly as the vehicle travels in a straight path with no side load. In the present power steering system 26, the pressure regulator 190, due to the force of the hydraulic fluid 70 acting on the land 196a holds the pinion teeth 38 in intimate engagement with the rack teeth 44 so that all backlash is eliminated. Thus, when the driver turns the steering wheel 22, the left and right wheels 12 and 14 turn immediately in response to the steering wheel movement.

I claim:

1. In a vehicle power steering system having a movable wheel steering mechanism for steering of the vehicle wheels in response to manual movements of a steering control device and including hydraulic power means operatively connected for power boosting the movements of said wheel steering mechanism, the improvement comprising:
   a. control valve means having two relatively movable control elements for controlling application of hydraulic pressure to said hydraulic power means in accordance with the relative positions of said elements,
   b. a first follower element frictionally coacting with said steering control device and connected for moving one of said control elements of said valve means in response to manual movement of said steering control device, and
   c. a second follower element frictionally coacting with said wheel steering mechanism and connected for moving the other of said control elements of said valve means in response to movement of said wheel steering mechanism.

2. A vehicle power steering system according to claim 1 in which said control valve means includes means for controlling application of hydraulic pressure to said hydraulic power means to cause hydraulic pressure boosted steering of the vehicle wheels in a direction and at a magnitude corresponding to relative movements between said two control elements.

3. The vehicle power steering assembly of claim 2 including means for increasing and decreasing hydraulic pressure as the wheel steering mechanism is manipulated.

4. A hydraulic power system including
   an elongated housing,
   a rack member disposed along the longitudinal axis of the housing and adapted to move rectilinearly along said axis,
   first and second piston means, said first piston means being attached to one end of the rack member and said second piston means being attached to the opposite end of the rack member,
   a pinion member disposed in the housing and adapted to be manually rotated, said pinion member engaging the track member and moving said track member on being rotated,
   means for applying hydraulic pressure to the piston means to provide a power assist to the rack member movement, said pressure applying means including a pump for pumping hydraulic fluid to the piston means, transmission means for placing the piston means in communication with the pump, and valve means including a pair of movable members which move relative to each other to control the flow of hydraulic fluid to the piston means, and means for moving the valve members including a first follower element having one end connected to one of the valve members and another end in frictional engagement with the rack member, and a second follower element having one end connected to the other valve member and another end in frictional engagement with the pinion member, whereby the valve members will be moved to different positions relative to each other in response to the movement of the rack and pinion members.

5. The hydraulic power system of claim 4 where the valve members have a first position which discontinues essentially all communication between the piston means and the pump, a second position placing only the first piston means in communication with the pump, and a third position placing only the second piston means in communication with the pump, said valve members being moved to the second position when the rack and pinion members are moved in one direction and being moved to the third position when the rack and pinion members are moved in a direction opposite to said one direction.

6. The hydraulic power system of claim 5 including means which normally urge these valve members to the first position.

7. The hydraulic power system of claim 6 including regulator means controlling pump pressure, said regulator means being responsive to changing loads on the rack member to change the pump pressure in proportion to the load on the rack member.

8. The hydraulic power system of claim 7 where the first valve member is a sleeve and the second valve member is a spool, said sleeve having a plurality of openings therein and fitting snugly about the spool, said spool and sleeve moving relative to each other when the rack and pinion move to change the relative position of the sleeve and spool to discontinue communication between one piston means and the pump while placing the other piston means in communication with the pump.

9. In a vehicle where each front wheel of the vehicle is equipped with steering means, each of said steering means being connected to a rack and pinion steering assembly actuated by the vehicle's driver rotating the vehicle's steering wheel,
   an elongated housing including a generally horizontal, cylindrical interior,
   a rack member disposed horizontally along the longitudinal axis of the housing interior and adapted to move rectilinearly in a horizontal direction.
   a pair of tie rods, one tie rod having one end connected to one end of the rack member and another end connected to one front wheel steering means, and the other tie rod having one end connected to the opposite end of the rack member and another end connected to the other fron wheel steering means,
   a pair of piston heads snugly fitting within the cylindrical housing one piston head attached to one end of the rack member and the other piston head attached to the opposite end of the rack member, said rack member being received in the piston heads so that said rack member can move slightly in a vertical direction as the load on the rack member changes,
   a pinion member disposed in the housing and adapted to be rotated when the vehicle's driver rotates the vehicle steering wheel, said pinion member engaging the rack member and moving the rack member horizontally on being rotated,
   means for applying hydraulic pressure to the piston heads to provide a power assist to the rack member movement, said pressure applying means including a pump having a pressure side and a suction side for pumping hydraulic fluid to the piston heads, transmission means for placing the piston heads in communication with the pump, and valve means for controlling the flow of hydraulic fluid to the piston heads, said valve means including a body member with at least one groove therein, and a sleeve having a plurality of openings therein, said sleeve fitting snugly about the body member, and said sleeve and body member being adapted to move relative to each other, means for moving the sleeve and body member relative to each other including a first follower element having one end connected to the body member and another end in frictional engagement with the pinion member to move said body member in response to the rotational movement of the pinion member, and a second follower element having one end connected to the sleeve and another end in frictional engagement with the rack member to move said sleeve in response to the movement of the rack member, whereby said sleeve and body member will be moved to different positions relative to each other in response to the movement of the rack and pinion members to change the relative positions of the groove and openings so that one piston head is placed in communication with the pump means while communication between the pump and other piston head is discontinued, means operable when a moving force is not being applied to the rack and pinion members which urges the sleeve and body member into a relative position where essentially all communication between the pump and both piston heads is discontinued, and regulator means for controlling pump pressure, said regulator means including a pressure chamber having an inlet in communication with the pressure side of the pump and an outlet in communication with the suction side of the pump, and a bearing member in the chamber which engages the rack member and tends to force the rack member into engagement with the pinion member, said bearing member being disposed to move up and down in a vertical direction when the load on the rack changes to control the rate of flow of hydraulic fluid between the inlet and outlet and thereby regulate the hydraulic pressure produced by the pump as the load on the rack member changes.

10. The combination of claim 9 where the body member leads the sleeve member when the pinion rotates.

11. The combination of claim 10 where the body member has an instantaneous velocity greater than the instantaneous velocity of the sleeve.

12. The combination of claim 9 where the sleeve leads the body member when the rack member is moved by a change in load on the rack member.

13. The combination of claim 9 where the bearing member has a raised element having a predetermined surface area, said surface area regulating the downward force applied by the hydraulic fluid against the bearing member.

14. A hydraulic power system including
a drive member which is moved manually into different positions,
a driven member which is coupled to the drive member and moves in response to the movement of the drive member,
means for applying hydraulic pressure to the driven member to provide a power assist therefor, said pressure applying means including a pump for pumping hydraulic fluid to the driven member, transmission means for placing the pump in communication with the driven member, and valve means including a pair of valve members which move relative to each other to control the fluid flow of said driven member, and
means for moving the valve members including a first follower element having one end connected to one end of the valve members and another end in frictional engagement with te drive member, and a second follower element having one end connected to the other valve member and another end in frictional engagement with the driven member, whereby the valve members will be moved to different positions relative to each other in response to the movement of the drive and driven members.

15. The hydraulic power system of claim 14 including means which normally urge the valve members into a position to discontinue flow of hydraulic fluid to the driven member whenever a moving force not being applied to the drive member.

16. The hydraulic power system of claim 15 including regulator means for controlling the pressure produced by the pump.

* * * * *

UNITED STATES PATENT AND TRADEMARK OFFICE
CERTIFICATE OF CORRECTION

PATENT NO. : 3,831,697
DATED : August 27, 1974
INVENTOR(S) : Gunnar A. Wahlmark

It is certified that error appears in the above-identified patent and that said Letters Patent are hereby corrected as shown below:

Column 4, line 18, change "servovalve" to -- servo-valve --.

Column 4, line 36, change "128" to -- 138 --.

Column 5, line 16, change "154" to -- 54 --.

Column 7, line 41, change "vehicle on straight" to -- vehicle on a straight --.

Column 8, lines 45-46, change "This feel is" to -- This "feel" is --.

Column 12, line 33, change "te" to -- the --.

Signed and Sealed this third Day of February 1976

[SEAL]

Attest:

RUTH C. MASON
Attesting Officer

C. MARSHALL DANN
Commissioner of Patents and Trademarks